United States Patent
Hoshiya et al.

[11] Patent Number: 5,961,421
[45] Date of Patent: Oct. 5, 1999

[54] POWER ON SKIP DOWNSHIFT USING THREE CLUTCHES

[75] Inventors: Kazumi Hoshiya, Susono; Hidehiro Oba, Numazu, both of Japan

[73] Assignee: Toyota Jidosha Kabushiki Kaisha, Toyota, Japan

[21] Appl. No.: 09/132,075

[22] Filed: Aug. 10, 1998

[30] Foreign Application Priority Data

Aug. 11, 1997 [JP] Japan ................................ 9-216557

[51] Int. Cl.$^6$ ............................ F16H 61/04; F16H 61/16
[52] U.S. Cl. ............................ 477/140; 477/144; 477/80
[58] Field of Search .................. 477/76, 78, 79, 477/80, 143, 144, 140

[56] References Cited

U.S. PATENT DOCUMENTS

| | | | |
|---|---|---|---|
| 4,671,139 | 6/1987 | Downs et al. | 477/144 X |
| 5,647,819 | 7/1997 | Fujita et al. | 477/140 |
| 5,697,864 | 12/1997 | Watanabe | 477/133 X |

FOREIGN PATENT DOCUMENTS 3-121362   5/1991   Japan .

*Primary Examiner*—Khoi Q. Ta
*Attorney, Agent, or Firm*—Oblon, Spivak, McClelland, Maier & Neustadt, P.C.

[57] ABSTRACT

In an automatic transmission of the type wherein a stage intermediate between a higher speed stage and a lower speed stage is achieved through a clutch-to-clutch operation, a power-ON skip downshift is executed via the intermediate stage. First, when the skip downshift has been judged, the hydraulic pressure of the clutch (C4) of the higher speed stage is lowered. Next, when the input speed(r.p.m.) of the transmission have reached the synchronous r.p.m. (SS3) of the intermediate stage, the hydraulic pressure (P3) of the clutch (C3) of the intermediate stage is raised and adjusted so that the rise rate of the input r.p.m. may become a specific value d/dt(NT1). When the input r.p.m. have exceeded the synchronous r.p.m. (SS2) of the lower speed stage, the hydraulic pressure of the intermediate-stage clutch (C3) is adjusted so that the input r.p.m. may keep specific r.p.m. higher than the synchronous r.p.m. (SS2) of the lower speed stage, and simultaneously, the hydraulic pressure of the clutch (C2) of the lower speed stage is gradually raised. Finally, when a predetermined time period has lapsed since the start of the operation of raising the hydraulic pressure (P2) of the clutch (C2), the hydraulic pressure (P3) of the clutch (C3) is gradually lowered till the end of the gearshift.

2 Claims, 12 Drawing Sheets

FIG.12

|    | 1ST  | 2ND  | 3RD  | 4TH  |
|----|------|------|------|------|
| C1 | ◯    | ◯    | ◯    | ◯    |
| C2 |      | ◯    |      |      |
| C3 |      |      | ◯    |      |
| C4 |      |      |      | ◯    |
| FW | LOCK | FREE | FREE | FREE |

◯ : ENGAGED

POWER ON SKIP DOWNSHIFT USING THREE CLUTCHES

BACKGROUND OF THE INVENTION

1. Field of the Invention

The present invention relates to a gearshift control apparatus for an automatic transmission wherein a skip downshift from a higher speed stage to a lower speed stage in a power-ON state is executed via a stage intermediate between the higher and lower speed stages. Here, each of a gearshift from the higher speed stage to the intermediate stage, and a gearshift from the intermediate stage to the lower speed stage is done through a clutch to-clutch operation based on releasing and engaging a plurality of clutches.

2. Description of the Prior Art

A power-ON skip downshift is executed when the driver of a motor vehicle has deeply pressed the accelerator pedal in order to attain a rapid acceleration.

The official gazette of Japanese Patent Application Laid-open No. 121362/1991 discloses a control technique wherein the power-ON skip downshift of, for example, the fourth speed stage→second speed stage of an automatic transmission is executed by clutch-to-clutch gearshifting. The gearshift control is performed via the intermediate stage (third speed stage) of the automatic transmission, and a command for the intermediate stage is canceled before this intermediate stage is completely achieved.

When the intermediate stage is involved in executing a skip gearshift, the r.p.m. or, rotational speed of a rotary member can be changed more smoothly and a gearshift shock can be alleviated.

On that occasion, the whole gearshifting period of time required till the completion of the skip gearshift can be shortened by applying the technique as disclosed in the above official gazette of Japanese Patent Application Laid-open No. 121362/1991.

The control technique in the prior art, however, uses a one-way clutch for achieving the engagement of the 1intermediate stage. That is, the prior-art technique has the problem that it cannot be simply applied to an automatic transmission of the type in which the engagement of the intermediate stage is achieved by the clutch-to-clutch operation. As is well known, when the one-way clutch is mounted anew, increases in weight and in cost are incurred correspondingly.

SUMMARY OF THE INVENTION

The present invention has been made in view of the problem of the prior art as stated above, and has for its object to provide a gearshift control apparatus in which a power-ON skip downshift can be favorably done via the intermediate stage, in an automatic transmission of the type wherein the engagement of an intermediate stage is achieved through a clutch-to-clutch operation, not by a one-way clutch.

The present invention has accomplished the object by a gearshift control apparatus for an automatic transmission as defined in claim 1 and as has its purport illustrated in FIG. 1. That is, it is the premise of the gearshift control apparatus that a skip downshift from a higher speed stage to a lower speed stage in a power-ON state is executed via a stage intermediate between the higher and lower speed stages, and that each of a gearshift from the higher speed stage to the intermediate stage, and a gearshift from the intermediate stage to the lower speed stage, is done through a clutch-to-clutch operation based on releasing and engaging a plurality of clutches. Hereupon, the gearshift control apparatus is constructed and operated as follows: First detection means detects a judgement that the power-ON skip downshift from the higher speed stage to the lower speed stage is to be executed. First control means operates after the detection by the first detection means to lower a hydraulic pressure of the higher-speed-stage clutch and thereby to raise input speed (r.p.m., namely, revolutions per minute) of the transmission. Second detection means detects a fact that the input r.p.m. of the transmission have reached synchronous r.p.m. of the intermediate stage owing to the operation of the first control means. Second control means operates after the detection by the second detection means to raise and adjust a hydraulic pressure of the intermediate-stage clutch so that a rise rate of the input r.p.m. of the transmission may become a specific value. Third detection means detects a fact that the input r.p.m. of the transmission have exceeded synchronous r.p.m. of the lower speed stage owing to the operation of the second control means. Third control means operates after the detection by the third detection means to adjust the hydraulic pressure of the intermediate-stage clutch so that the input r.p.m. of the transmission may keep a specific r.p.m. higher than the synchronous r.p.m. of the lower speed stage, and simultaneously to gradually raise a hydraulic pressure of the lower speed-stage clutch. Fourth control means gradually lowers the hydraulic pressure of the intermediate-stage clutch after lapse of a specific time period since start of the operation of the third control means.

In a case where the adjustment of the hydraulic pressure of the intermediate-stage clutch is made by a "feedback control", the input r.p.m. of the transmission can be raised as very smoothly as substantially ideally.

It is especially recommendable to keep the input r.p.m. of the transmission at the (synchronous r.p.m. of the lower speed stage)+(specific magnitude) by "feedback-controlling" the hydraulic pressure of the intermediate-stage clutch. More specifically, when the input r.p.m. of the transmission have been lowered down to the synchronous r.p.m. of the lower speed stage owing to the torque capacity bestowed on the lower-speed-stage clutch, the hydraulic pressure of the intermediate-stage clutch which is feedback-controlled so as to keep the higher value shifts this clutch to the release side "automatically" (or inevitably). Therefore, the very smooth changeover between both the clutches is realized.

BRIEF DESCRIPTION OF THE DRAWINGS

The above and other objects, features and advantages of the present invention will become more apparent from the following description of the invention taken in conjunction with the accompanying drawings, wherein like reference characters designate the same or similar parts, and wherein:

FIG. 12 is a table showing the engagement states of clutches which correspond to the respective gearshift stages of the automatic transmission depicted in FIG. 11.

DETAILED DESCRIPTION OF THE PREFERRED EMBODIMENTS

Figure 1:
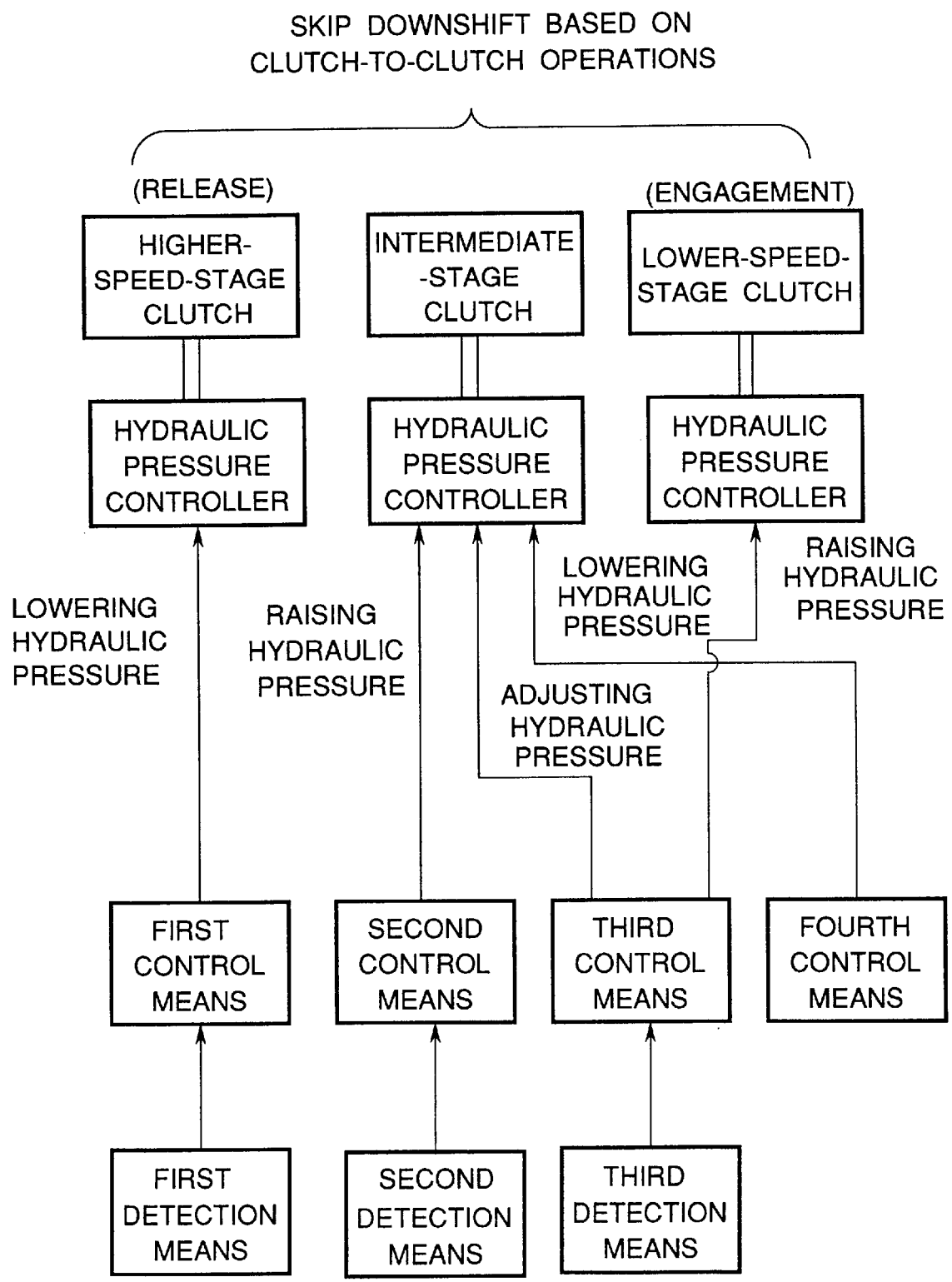
FIG. 1 is a block diagram showing the purport of the present invention.

As will be concretely described in connection with the aspects of performance, the present invention is applicable to an automatic transmission for a motor vehicle.

In this specification, terms "higher-speed-stage clutch", "intermediate-stage clutch" and "lower-speed-stage clutch" are intended to mean those clutches of the transmission which are respectively concerned with keeping the higher speed stage, intermediate stage and lower speed stage of the transmission (in other words, the clutches the engagements of which establish the respectively corresponding gearshift stages).

In the (higher speed stage)→(lower speed stage) downshift of the transmission, accordingly, the higher-speed-stage clutch having been engaged before the gearshift is released, while the lower-speed-stage clutch having been released before the gearshift is engaged owing to the gearshift. In case of clutch-to-clutch gearshifting, when the higher-speed-stage clutch and the lower-speed-stage clutch are not changed-over appropriately, the transmission approaches its neutral state to incur abnormal rise in the r.p.m. or rotational speed of the engine of the motor vehicle, or it approaches its locking state to degrade the durability of the power transmission system of the motor vehicle.

In the case of the skip gearshift, the gear ratio of the higher speed stage and that of the lower speed stage differ greatly, and hence, the changeover between the clutches of these speed stages become very difficult.

A gearshift control in which the intermediate stage is involved, serves to relieve the drawback as far as possible.

On the basis of this idea, the intermediate stage is involved midway in the power-ON skip downshift from the higher speed stage to the lower speed stage. In actuality, however, the intermediate stage is not completely established, but the interim semi-established state thereof is utilized. More specifically, when the higher-speed-stage clutch is released, the input r.p.m. of the transmission begin to rise (for the reason that the r.p.m. of the engine are about to rise because of a "power-ON state" in which power is being transmitted from the engine side of the motor vehicle to the wheel side thereof). Subsequently, when the input r.p.m. of the transmission have reached the synchronous r.p.m. of the intermediate stage, the hydraulic pressure of the intermediate-stage clutch is raised. Thereupon, the hydraulic pressure of the intermediate-stage clutch is adjusted at a certain level, whereby the input r.p.m. of the transmission are raised at a specific rate (at a predetermined speed) up to the synchronous r.p.m. of the lower speed stage. Thereafter, the hydraulic pressure of the intermediate-stage clutch is adjusted so that the input r.p.m. of the transmission maybe kept at specific r.p.m. exceeding the synchronous r.p.m. of the lower speed stage. Simultaneously with the adjustment of the hydraulic pressure of the intermediate-stage clutch, the hydraulic pressure of the lower-speed-stage clutch is raised. At the proper time at which the lower-speed-stage clutch begins to be engaged, the intermediate-stage clutch is released. Thus, the skip downshift from the higher speed stage to the lower speed stage is completed.

If the intermediate-stage clutch is completely engaged, the input r.p.m. of the transmission are kept at the synchronous r.p.m. of the intermediate stage and are hindered from rising any more. Therefore, the intermediate-stage clutch is not completely engaged, but it is maintained in a slip state. In addition, the slip state is utilized as means for smoothly raising the input r.p.m. of the transmission. Since the intermediate-stage clutch is not completely engaged, the input r.p.m. of the transmission can exceed the synchronous r.p.m. of the intermediate stage. Thereafter, if the hydraulic pressure of the intermediate-stage clutch is raised to make the slip thereof less (namely, to intensify the engagement force thereof), the rise rate of the input r.p.m. of the transmission decreases. In contrast, if the hydraulic pressure of the intermediate-stage clutch is lowered to make the slip thereof greater (namely, to weaken the engagement force thereof), the rise rate of the input r.p.m. of the transmission increases.

Moreover, when the input r.p.m. of the transmission have been heightened in excess of the synchronous r.p.m. of the lower speed stage in this way, the hydraulic pressure of the intermediate-stage clutch is adjusted so as to keep the input r.p.m. of the transmission at the value which somewhat exceeds the synchronous r.p.m. of the lower speed stage (namely, the value which is a specific or predetermined magnitude greater than the synchronous r.p.m. of the lower speed stage). Simultaneously with the adjustment, the hydraulic pressure of the lower-speed-stage clutch is raised.

It is intended to smoothen the changeover between the intermediate stage clutch and the lower-speed-stage clutch that the value being to be the specific magnitude greater than the synchronous r.p.m. of the lower speed stage is kept for a specific time period. More specifically, before the lower-speed-stage clutch comes to have a torque capacity, the intermediate-stage clutch continues to have a torque capacity, and hence, the input r.p.m. of the transmission are kept near the synchronous r.p.m. of the lower speed stage. However, since the lower-speed-stage clutch finally bears the whole torque capacity with the intermediate-stage clutch released completely, both these clutches must be favorably changed-over on this occasion.

If the input r.p.m. of the transmission are intended to be kept at the very synchronous r.p.m. of the lower speed stage by the intermediate-stage clutch, both the clutches might fail to be changed over. Namely, when the input r.p.m. of the transmission are kept somewhat lower than the synchronous r.p.m. of the lower speed stage on account of the manufactural discrepancies of the clutches, the transmission undergoes so-called "semi-lock" due to the interference of the situation with the engagement of the lower-speed stage clutch acting to make the input r.p.m. higher than the synchronous r.p.m. In this regard, in the case where the input r.p.m. of the transmission are kept higher than the synchronous r.p.m. of the lower speed stage in spite of the manufactural discrepancies, the lower-speed-stage clutch can smoothly proceed toward its perfect engagement, and the lock does not take place.

Thus, although the skip downshift is executed by utilizing the clutch-to-clutch operation for the intermediate-stage clutch as described above, it is actually done via the "semi-established" intermediate stage, so that an operation being substantially the same as in a mere gearshift skipping over no gear stage can be attained, and thereby to realize a shortened gearshifting time period and a smooth torque variation in spite of the involvement of the intermediate stage in the downshift.

Now, the more concrete embodiments of the present invention will be described with reference to the drawings.

Figure 11:
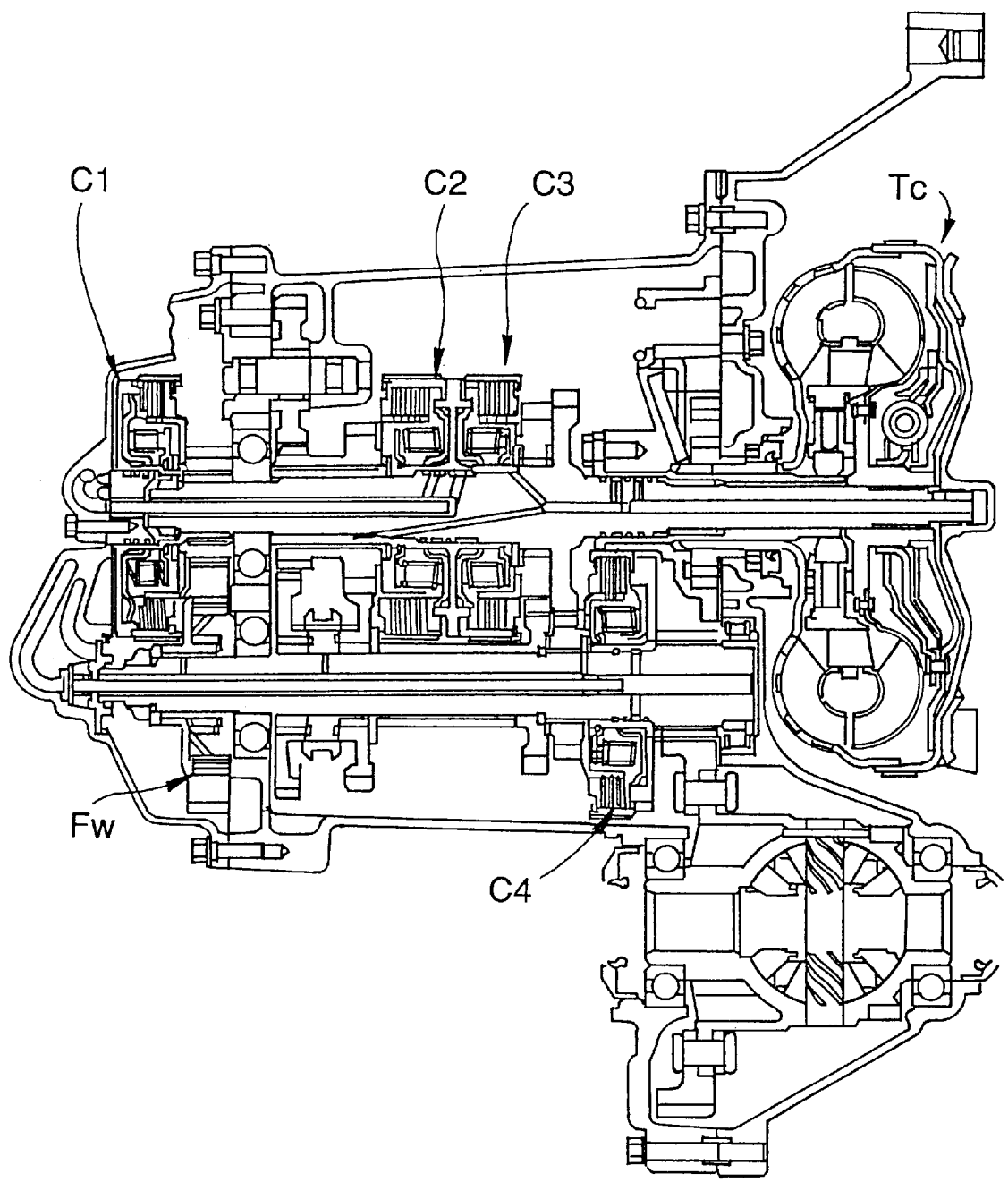
FIG. 11 is a vertical sectional view showing the whole construction of an automatic transmission to which the present invention is applied.

An automatic transmission illustrated in FIG. 11 has been known in itself. Symbols C1~C4 denote first~fourth (speed-stage) clutches which establish first speed stage~fourth speed stage, respectively. Symbol Fw denotes a one-way clutch, and symbol Tc a torque converter.

As tabulated in FIG. 12, in this automatic transmission, a downshift from the fourth speed stage to the third speed stage is achieved by clutch-to-clutch gearshifting based on the release of the fourth clutch C4 and the engagement of the third clutch C3. Also, a downshift from the third speed stage to the second speed stage is achieved by clutch-to-clutch gearshifting based on the release of the third clutch C3 and the engagement of the second clutch C2. The present invention is therefore applied in case of executing a skip downshift from the fourth speed stage to the second speed stage in the illustrated automatic transmission.

In this embodiment, accordingly, the fourth speed stage corresponds to a higher speed stage, the third speed stage does to an intermediate stage, and the second speed stage does to a lower speed stage.

Besides, the fourth clutch C4 establishing the fourth speed stage corresponds to a higher-speed-stage clutch, the third clutch C3 establishing the third speed stage does to an intermediate-stage clutch, and the second clutch C2 establishing the second speed stage does to a lower-speed-stage clutch.

In the illustrated automatic transmission, a downshift from the second speed stage to the first speed stage is achieved by utilizing the phenomenon that the one-way clutch is turned from an idle state into a lock state by changing in the flow of power transmission due to the release of the second clutch. Accordingly, the (second speed stage→first speed stage) downshift is not a clutch-to-clutch gearshift, and the present invention is not applied thereto.

Incidentally, the "clutch" termed here signifies a clutch (a frictional engagement device) in a broad sense, and it contains the concepts of both an ordinary clutch and a brake.

Next, the contents of controls will be described in detail.

Figure 2:
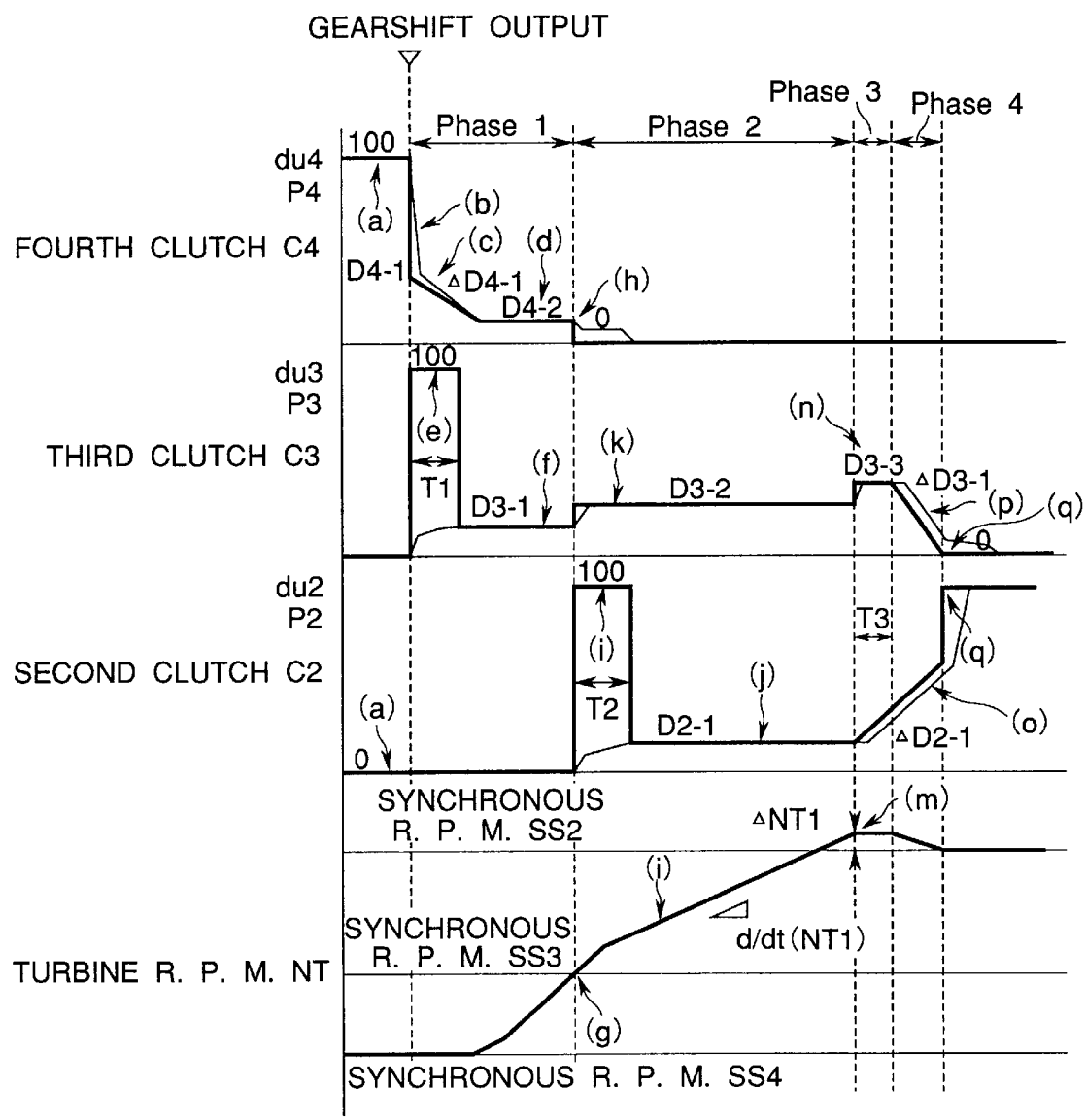
FIG. 2 is a time chart showing the control characteristics of an automatic transmission for a motor vehicle to which the present invention is applied.

FIG. 2 is a time chart showing the contents of a control operation in the first embodiment. The time chart illustrates the correlations among parameters du4, P4, du3, P3, du2, P2, and NT. The du4 is a duty ratio du4 for the fourth clutch C4 of the fourth speed stage (higher speed stage) (=duty ratio which is outputted to a duty solenoid for the hydraulic pressure control of the higher-speed-stage clutch). The P4 is a hydraulic pressure of the fourth clutch C4. The du3 is a duty ratio for the third clutch C3 of the third speed stage (intermediate stage) (=duty ratio which is outputted to a duty solenoid for the hydraulic pressure control of the intermediate stage clutch). The P3 is a hydraulic pressure of the third clutch C3. The du2 is a duty ratio for the second clutch C2 of the second speed stage (lower speed stage) (=duty ratio which is outputted to a duty solenoid for the hydraulic pressure control of the lower-speed-stage clutch). The P2 is a hydraulic pressure P2 of the second clutch C2. Further, the NT is a turbine r.p.m. NT (=input r.p.m. of the transmission). Here in the figure, a bold line indicates the duty ratio, while a fine line indicates the hydraulic pressure.

In this case, a line pressure of 100% is supplied to the corresponding clutch for the duty ratio of 100%, whereas the hydraulic pressure of the corresponding clutch is drained for the duty ratio of 0%.

A part indicated by (a) at the left end of FIG. 2 illustrates that state before the gearshift operation in which the fourth (higher-speed stage) clutch C4 is fully or completely engaged owing to the duty ratio du4 of the fourth speed stage amounting to 100%, and in which the second (lower-speed-stage) clutch C2 is fully released owing to the duty ratio du2 of the second speed stage amounting to 0% (that is, the state in which the fourth speed stage is established).

Under the illustrated state of the fourth speed stage, when a power-ON skip downshift to the second speed stage is to be effected, the duty ratio du4 of the fourth speed stage is first lowered to a value D4-1 below about 50% in compliance with a downshift command (the generation of a gearshift output), thereby to skip down the hydraulic pressure P4 of the fourth-speed-stage clutch C4 [refer to a part indicated by (b) in the figure]. After the skip-down, the duty ratio du4 of the fourth speed stage is gradually lowered at a constant rate Δ D4-1, thereby to lower the hydraulic pressure P4 of the fourth-speed-stage clutch C4 [as sweep-down shown at a part indicated by (c) in the figure]. When the duty ratio du4 has been lowered down to the very limit value D4-2 at which the fourth-speed-stage clutch C4 does not have torque capacity, the value D4-2 is kept for a while [refer to a part indicated by (d) in the figure].

On this stage, the second-speed-stage clutch C2 is not subjected to any operation (that is, du2=0% is held), but the third-speed-stage (intermediate-stage) clutch C3 is subjected to "first quick fill (FQF)" (that is, an operation in which oil is quickly introduced in the fully open state of the oil passage in order to decrease the clearance or "play" of the clutch plate rapidly. More specifically, in compliance with the skip downshift command, the duty ratio du3 of the third speed stage is first set at 100%, thereby to implement the "first quick fill (FQF)" of the third-speed-stage clutch C3 [refer to a part indicated by (e) in the figure]. Here, the FQF is implemented for a predetermined time period T1 which is set by an FQF timer for the duty ratio du3. When the FQF has ended, the duty ratio du3 of the third speed stage is fixed at the very level D3-1 at which the third-speed-stage clutch C3 has some torque capacity [refer to a part indicated by (f) in the figure].

When the fourth-speed-stage clutch C4 having been engaged before, begins to slip owing to the lowering of the hydraulic pressure P4 of the fourth-speed-stage clutch C4, the turbine r.p.m. NT begin to rise from the synchronous r.p.m. SS4 of the fourth speed stage (according to rise of engine r.p.m.).

In due course, upon the detection of the fact that the turbine r.p.m. NT have reached the synchronous r.p.m. SS3 of the third speed stage [refer to a part indicated by (g) in the figure], the duty ratio du4 of the fourth speed stage is fixed at 0% [refer to a part indicated by (h) in the figure], while the "first quick fill (FQF)" is implemented for the second-speed stage clutch C2 [refer to a part indicated by (i) in the figure].

Here, the FQF is implemented for a predetermined time period T2 which is set by an FQF timer for the duty ratio du2. When the FQF has ended, the duty ratio du2 of the second speed stage is fixed at the very level D2-1 at which the second-speed-stage clutch C2 does not have torque capacity [refer to a part indicated by (j) in the figure].

In addition, the duty ratio du3 of the third speed stage is fixed at a predetermined value D3-2 which is somewhat raised [refer to a part indicated by (k) in the figure]. The predetermined value D3-2 in this case is preset as the map value of a turbine torque so that the rise rate of the turbine r.p.m. NT may become a specific value d/dt(NT1). Accordingly, the turbine r.p.m. Ate raised at the constant rate [d/dt(NT1)] by keeping the duty ratio du3 of the third speed stage at the value D3-2 [refer to apart indicated by (l) in the figure].

In due course, upon the detection of the fact that the turbine r.p.m. NT rising at the constant rate d/dt(NT1) have reached a level of (the synchronous r.p.m. SS2 of the second speed stage+a predetermined value $\Delta$ NT1) [refer to a part indicated by (m) in the figure], the duty ratio du3 of the third speed stage is fixed at a value D3-3 for a predetermined time period T3 set beforehand [refer to a part indicated by (n) in the figure]. Here, the value D3-3 is preset as the map value of the turbine torque so that the turbine r.p.m. NT may be kept at (the synchronous r.p.m. SS2 of the second speed stage+the predetermined value $\Delta$ NT1).

At the same time, the duty ratio du2 of the second speed stage is swept up at a constant rate $\Delta$ D2-1 [refer to a part indicated by (o) in the figure]. Incidentally, the predetermined time period T3 for which the duty ratio du3 of the third speed stage is kept fixed at the value D3-3 corresponds to a time period in which the second-speed-stage clutch C2 begins to have the torque capacity owing to the rise of the hydraulic pressure based on the sweep-up of the duty ratio du2 of the second speed stage. The value of this time period T3 is measured by an experiment or the like beforehand.

Upon the lapse of the predetermined time period T3, the duty ratio du3 of the third speed stage is swept down at a constant rate $\Delta$ D3-1 [refer to a part indicated by (p) in the figure]. On the other hand, the duty ratio du2 of the second speed stage is continually swept up at the constant rate $\Delta$ D2-1. At the control step of detecting the fact that the duty ratio du3 of the third speed stage has become 0% as the result of the sweep-down and that the second-speed-stage clutch C2 has completed its engagement (for example, detecting that the turbine r.p.m. NT have agreed with the synchronous r.p.m. SS2 of the second speed stage), the duty ratio du3 of the third speed stage is fixed at 0%, and that duty ratio du2 of the second speed stage is fixed at 100% [refer to a part indicated by (q) in the figure]. Then, the skip downshift in this embodiment is completed.

Next, the contents of the gearshift control will be described in conjunction with flow charts.

Here, the respective steps of the control shall be named "phases 1~4".

As indicated in FIG. 2, the phase 1 signifies the control step which extends since the beginning of the gearshift until the turbine r.p.m. NT exceed the synchronous r.p.m. SS3 of the third speed stage. The phase 2 signifies the control step which extends since the end of the phase 1 until (the turbine r.p.m. NT≧the synchronous r.p.m. SS2 of the second speed stage+$\Delta$ NT1) holds. The phase 3 signifies the control step which extends since the end of the phase 2 till the lapse of the predetermined time period T3. The phase 4 signifies the final control step which extends since the end of the phase 3 till the completion of the engagement of the second-speed-stage clutch C2.

Figure 3:
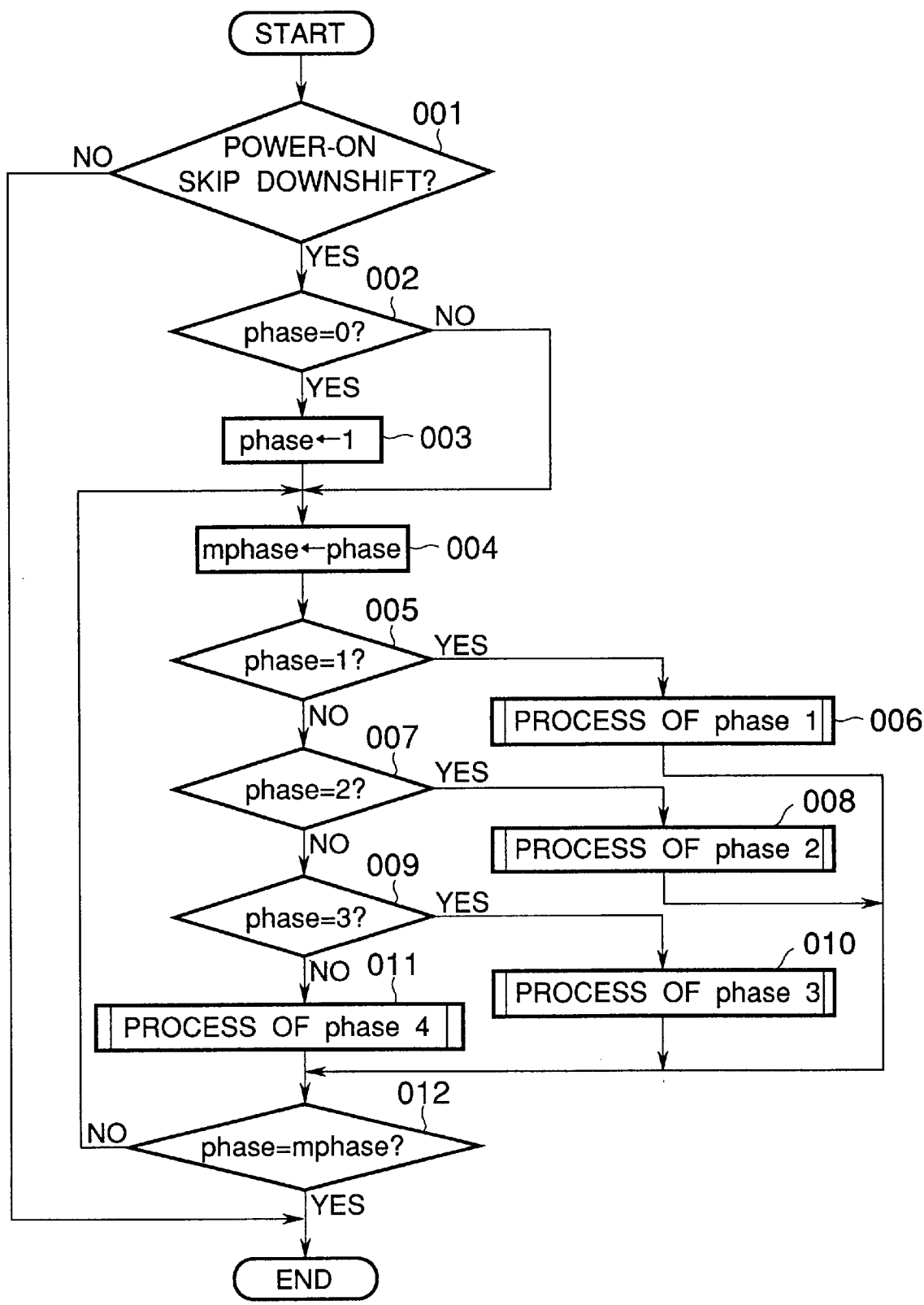
FIG. 3 is a flow chart of a control for attaining the characteristics depicted in FIG. 2.

FIG. 3 is the flow chart showing the entire gearshift control. Incidentally, symbol "phase" in the flow of the control sometimes denotes a phase flag.

In the flow, whether or not the power-ON skip downshift is requested is judged at the first step 001. The skip downshift request in this case is outputted in any of an unshown and known flow for judging gearshifts, etc. By way of example, whether or not the downshift from the fourth speed stage to the second speed stage is to be effected is judged depending upon whether or not the drive state of the motor vehicle at the current time has traversed a "fourth speed stage→second speed stage" downshift line, in view of a map constructed by the opening degree of a throttle valve and the speed of the vehicle. Subject to "NO" as the judgement at the step 001, the routine of the gearshift control is directly ended.

Subject to "YES" as the judgement at the step 001, whether or not phase=0 (not being under gearshift) holds is judged at a step 002. In the first cycle, phase=0 holds owing to the last processing of the gear shift control, and hence, the step 002 is followed by a step 003 at which phase=1 is established. In a case where the judgement at the step 002 is "NO", that is, where any of phase=1~phase=4 holds, the step 003 is passed. At a step 004, anyway, the value of the phase at the current time ("1" in the first cycle) is entered into a flag "mphase".

Thereafter, the subroutine processes of the respective phases are executed. More specifically, for phase=1, the control flow advances from a step 005 to a step 006, at which the subroutine process of the phase 1 is executed. For phase=2, the control flow advances from a step 007 to a step 008, at which the subroutine process of the phase 2 is executed. For phase=3, the control flow advances from a step 009 to a step 010, at which the subroutine process of the phase 3 is executed. Besides, for phase=4, the subroutine process of the phase 4 is executed at a step 011. After the process of each of the phases has been executed, it is judged at a step 012 whether or not the current phase is the "mphase" entered at the step 004, that is, whether or not the value of the phase flag has changed. When the judgement at the step 012 is "NO" (that is, the phase value has changed), the control flow is returned to the step 004, and the process of the pertinent phase is executed. On the other hand, when the judgement at the step 012 is "YES" (that is, the phase value has not changed), the control flow is ended.

Figure 4:
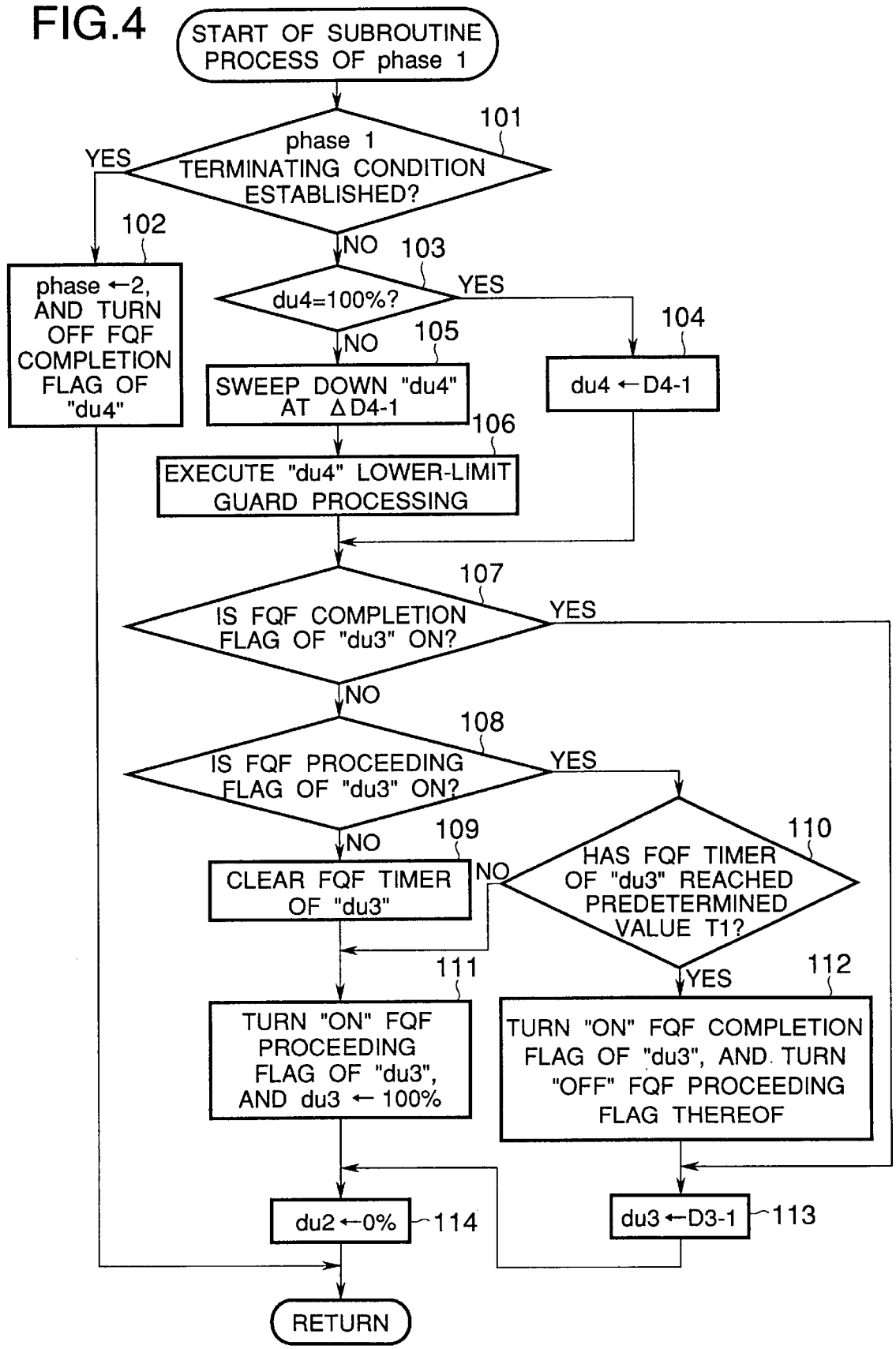
FIG. 4 is a flow chart of the subroutine of phase 1 which is included in the flow chart of FIG. 3.

FIG. 4 illustrates the flow chart of the subroutine process of the phase 1.

In this process, whether or not a condition for terminating the phase 1 is satisfied is first judged at a step 101. The termination of the phase 1 is decided in accordance with the following condition:

(1) Turbine r.p.m. NT≧Synchronous r.p.m. SS3 of Third speed stage.

If the judgement at the step 101 is "YES" [corresponding to the part (g) in FIG. 2], the processing of a step 102 is executed, and if the judgement is "NO", the processing of steps 103 et seq. is executed. At the step 102, the phase is set at "2", and the FQF completion flag of the duty ratio du4 on the fourth speed stage is turned OFF.

Among the processing of the steps 103 et seq., the steps 103~106 concern the control of the duty ratio du4 of the hydraulic pressure P4 of the fourth-speed-stage clutch C4. In the first cycle, the duty ratio du4 is 100%, and hence, the step 103 is followed by the step 104, at which the duty ratio du4 is skipped down to the value D4-1. After the next cycle, the step 103 is followed by the step 105, at which the duty ratio du4 is swept down at the constant rate Δ D4-1. On that occasion, lower-limit guard processing is executed at the step 106 so that the duty ratio du4 may be prevented from lowering excessively. In this case, the lower limit value of the duty ratio du4 of the fourth speed stage is set at the largest possible value D4-2 within a range in which the fourth-speed-stage clutch C4 does not have any torque capacity. Thereafter, the control flow of the subroutine process advances to the step 107.

The steps 107~114 concern the control of the duty ratio du3 of the hydraulic pressure P3 of the third-speed-stage clutch C3. The step 107 serves to decide if the "first quick fill" (hereinbelow, abbreviated to "FQF") completion flag of the duty ratio du3 is "ON", while the step 108 serves to decide if the "FQF proceeding" flag of the duty ratio du3 is "ON" (that is, if the FQF is being implemented). In the first cycle, the FQF has not been implemented yet, and hence, the control flow advances along the steps 107→108→109. Here at the step 109, the FQF timer of the duty ratio d3 is cleared and started. At the step 111 succeeding to the step 109, the FQF proceeding flag of the duty ratio du3 is turned "ON", and the duty ratio du3 is set at 100%, thereby to initiate the operation of the FQF.

In the next cycle of the process, the judgement of the step 108 becomes "YES", and hence, the control flow advances to the step 110. Unless the value of the FQF timer of the duty ratio du3 reaches the predetermined time period T1, the step 110 is followed by the step 111 so as to continue the FQF operation. When the predetermined time period T1 has lapsed, the step 110 is followed by the step 112, at which the FQF completion flag of the duty ratio du3 is turned "ON", and the FQF proceeding flag thereof is turned "OFF". At the step 113 succeeding to the step 112, the duty ratio du3 is fixed at the value D3-1. The value D3-1 in this case is at the level at which the third speed-stage clutch C3 has some torque capacity.

Each of the steps 111 and 113 is followed by the step 114, at which the duty ratio du2 of the second speed clutch is kept at 0%. Hereupon, the control flow returns from its return step to the main routine.

Figure 5:
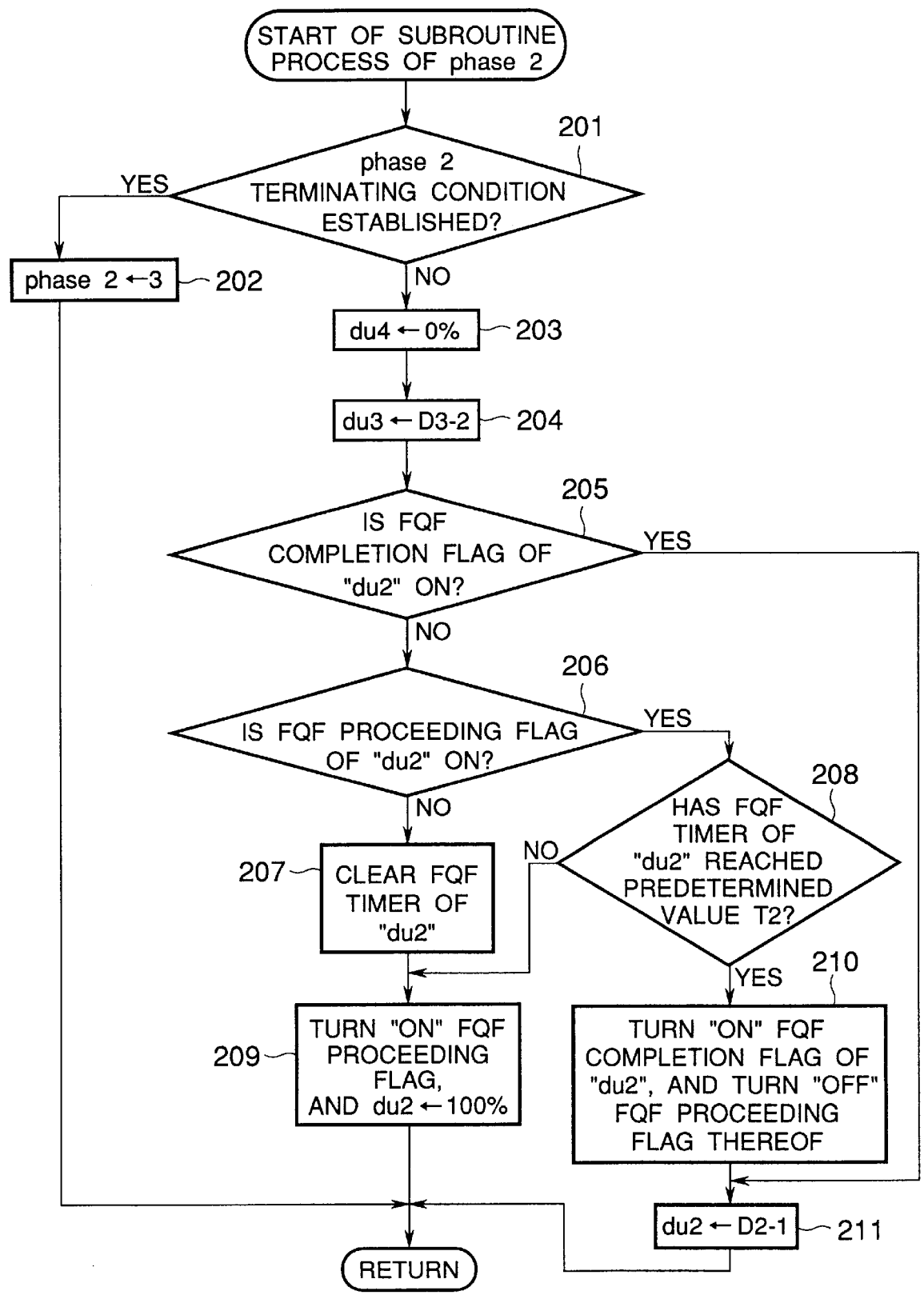
FIG. 5 is a flow chart of the subroutine of phase 2 which is included in the flow chart of FIG. 3.

FIG. 5 illustrates the flow chart of the subroutine process of the phase 2.

In this process, whether or not a condition for terminating the phase 2 is satisfied is first judged at a step 201. The termination of the phase 2 is decided in accordance with the following condition:

(1) Turbine r.p.m. NT≧Synchronous r.p.m. SS2 of Second speed stage+Predetermined value Δ NT1.

If the judgement at a step 201 is "YES", the phase is set at "3" at a step 202. If the judgement is "NO", the duty ratio du4 of the fourth speed stage is fixed at 0% at a step 203. Subsequently, at a step 204, the duty ratio du3 of the third speed stage is kept at the value D3-2. As stated before, the value D3-2 can keep the rise rate of the turbine r.p.m. NT at the constant value d/dt(NT1). Subsequently, the flow of the process advances to a step 205.

Steps 205~211 concern the control of the duty ratio du2 of the hydraulic pressure P2 of the second-speed-stage clutch C2. The step 205 serves to decide if the "first quick fill (FQF)" completion flag of the duty ratio du2 is "ON", while the step 206 serves to decide if the "FQF proceeding" flag of the duty ratio du2 is "ON" (that is, if the FQF is being implemented). In the first cycle, the FQF has not been implemented yet, and hence, the control flow advances along the steps 205→206→207. Here at the step 207, the FQF timer of the duty ratio d2 is cleared and started. At the step 209 succeeding to the step 207, the FQF proceeding flag of the duty ratio du2 is turned "ON", and the duty ratio du2 is set at 100%, thereby to initiate the operation of the FQF.

In the next cycle of the process, the judgement of the step 206 becomes "YES", and hence, the control flow advances to the step 208. Unless the value of the FQF timer of the duty ratio du2 reaches the predetermined time period T2, the step 208 is followed by the step 209 so as to continue the FQF operation. When the predetermined time period T2 has lapsed, the step 208 is followed by the step 210, at which the FQF completion flag of the duty ratio du2 is turned "ON", and the FQF proceeding flag thereof is turned "OFF". At the step 211 succeeding to the step 210, the duty ratio du2 is fixed at the value D2-1. The value D2-1 in this case is the largest possible value within a range in which the second-speed-stage clutch C2 does not have any torque capacity.

After any of the steps 202, 209 and 211, the control flow returns from its return step to the main routine.

Figure 6:
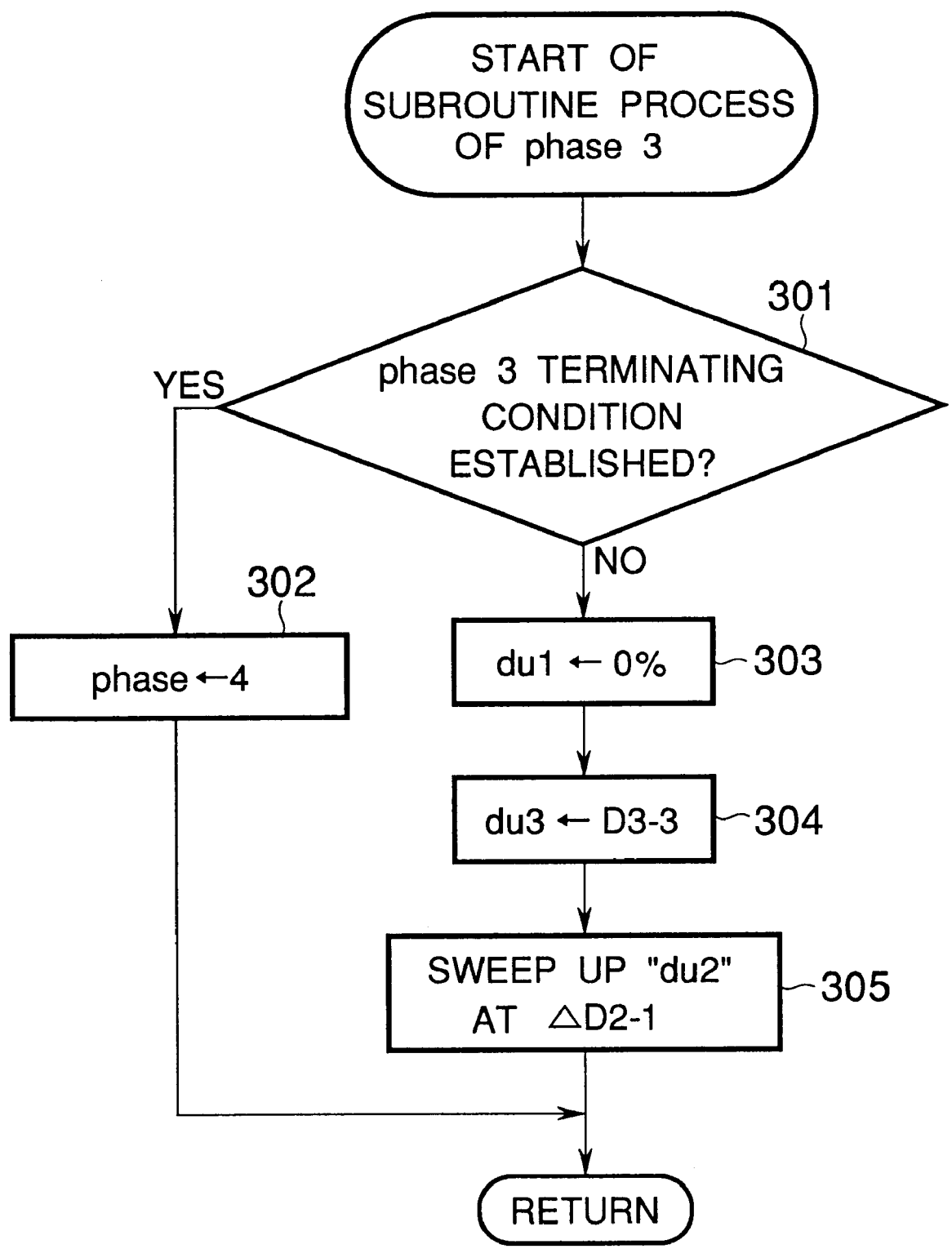
FIG. 6 is a flow chart of the subroutine of phase 3 which is included in the flow chart of FIG. 3.

FIG. 6 illustrates the flow chart of the subroutine process of the phase 3.

In this process, whether or not a condition for terminating the phase 3 is satisfied is first judged at a step 301. The termination of the phase 3 is decided in accordance with the following condition:

(1) The predetermined time period T3 as explained before has lapsed since the initiation of the phase 3.

If the judgement at a step 301 is "YES", the phase is set at "4" at a step 302. If the judgement is "NO", the duty ratio du4 of the fourth-speed-stage clutch C4 is kept at 0% at a step 303. Subsequently, at a step 304, the duty ratio du3 of the third-speed stage is kept at the value D3-3. As stated before, the value D3-3 can keep the turbine r.p.m. NT at the level of (the synchronous r.p.m. SS2 of the second speed stage+Δ NT1). Subsequently, the duty ratio du2 of the second-speed-stage clutch C2 is swept up at the constant rate Δ D2-1 at a step 305.

Figure 7:
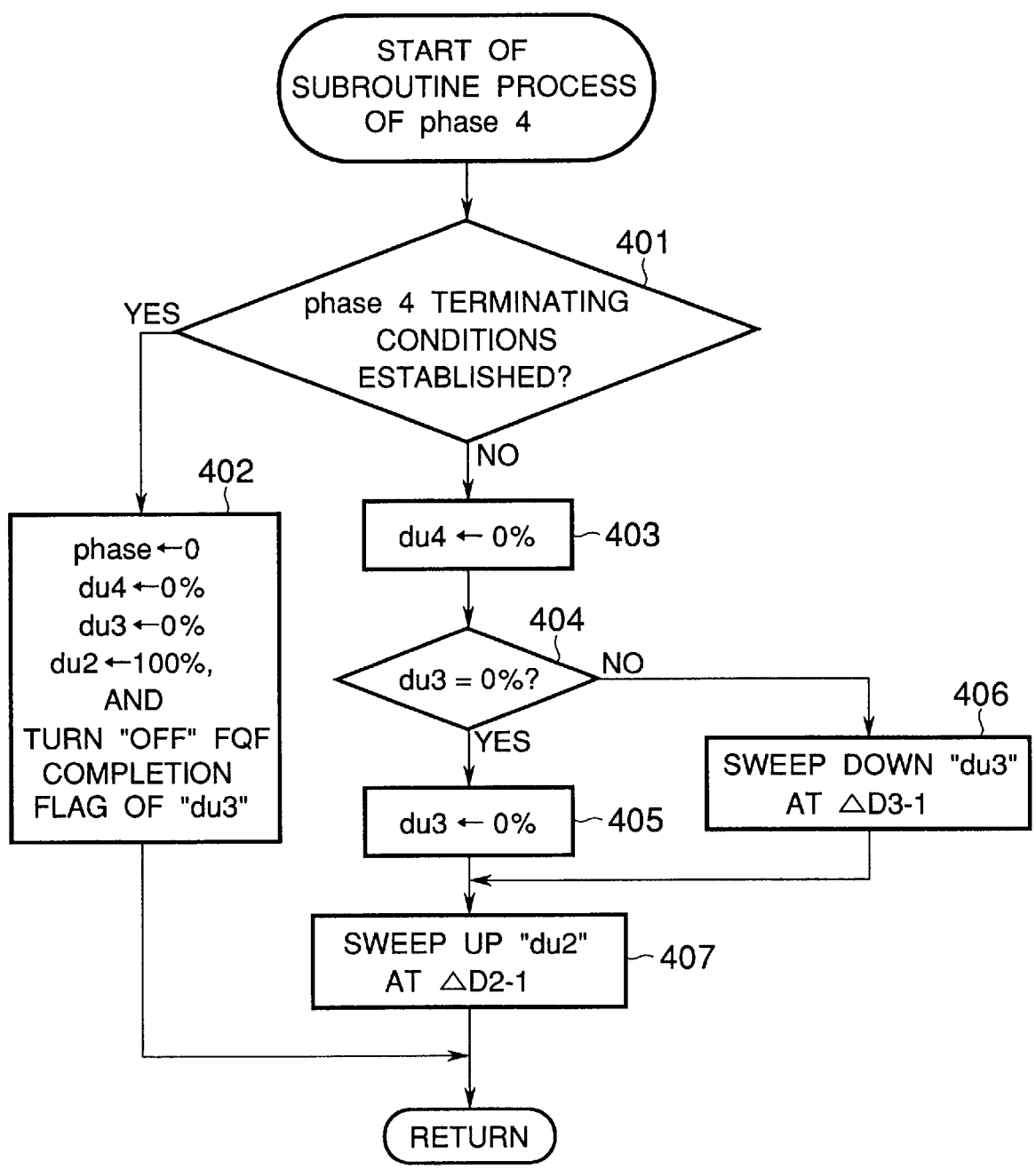
FIG. 7 is a flow chart of the subroutine of phase 4 which is included in the flow chart of FIG. 3.

FIG. 7 illustrates the flow chart of the subroutine process of the phase 4.

In this process, whether or not conditions for terminating the phase 4 are satisfied is first judged at a step 401. The termination of the phase 4 is decided in accordance with the following two condition:

(1) The second-speed-stage clutch C2 has engaged completely.

(2) The duty ratio du3 of the third-speed-stage clutch C3 is 0%.

Here, the completion of the engagement of the second-speed-stage clutch C2 can be detected with the fact that the turbine r.p.m. NT have agreed with the synchronous r.p.m. SS2 of the second speed stage.

If the judgement at a step 401 is "YES", the second speed stage is settled at a step 402, and if the judgement is "NO", the flow of the control advances to steps 403 et seq.

Unless the termination of the phase 4 is decided, the judgement at the step 401 is "NO". Therefore, the duty ratio du4 of the fourth speed stage is set at 0% at the step 403 succeeding to the step 401, and whether or not the duty ratio du3 of the third speed stage is 0% is judged at the step 404. On condition that the judgement at the step 404 is "NO", the duty ratio du3 of the third speed stage is swept down at the constant rate Δ D3-1 at the step 406. When du3=0% has held as the result of the sweep-down, the judgement at the step 404 becomes "YES", and the control flow advances to the step 405, at which the duty ratio du3 is fixed at 0%. Each of the steps 406 and 405 is followed by the step 407, at which the duty ratio du2 of the second speed stage is swept up at the constant rate Δ D2-1.

When the conditions for terminating the phase 4 have been fulfilled, the control flow advances from the step 401 to the step 402, at which the phase is set at "0" as gearshift termination processing. In addition, the duty ratio du4 of the fourth speed stage and that du3 of the third speed stage are fixed at 0%, and the duty ratio du2 of the second speed stage is fixed at 100%. Besides, the FQF completion flag of the duty ratio du3 on the third-speed-stage clutch C3 is turned "OFF".

In the above way, the skip downshift from the fourth speed stage to the second speed stage is completed in such a form that the third speed stage is involved in the gear-shifting.

In this manner, the skip downshift is executed by utilizing the "semi-established" clutch-to-clutch operation for the third speed stage being the intermediate stage, whereby the turbine r.p.m. can be smoothly shifted as if the gearshifting were of one stage. It is accordingly possible to realize a shortened gearshifting time period and a smooth torque variation.

By the way, although the foregoing embodiment has mentioned the case of fixing the duty ratio du3 of the third speed stage at the values D3-2 and D3-3 at the step 204 of the phase 2 (refer to FIG. 5) and the step 304 of the phase 3 (refer to FIG. 6), respectively, these values may well be adjusted by feedback controls. More specifically, the former value D3-2 is set for keeping the rise rate of the turbine r.p.m. NT at the constant value [d/dt(NT1)], while the latter value D3-3 is set for keeping the turbine r.p.m. at the constant value [the synchronous r.p.m. SS2 of the second speed stage+Δ NT1]. The values can be adjusted by the feedback controls in order to attain a better controllability.

Figure 8:
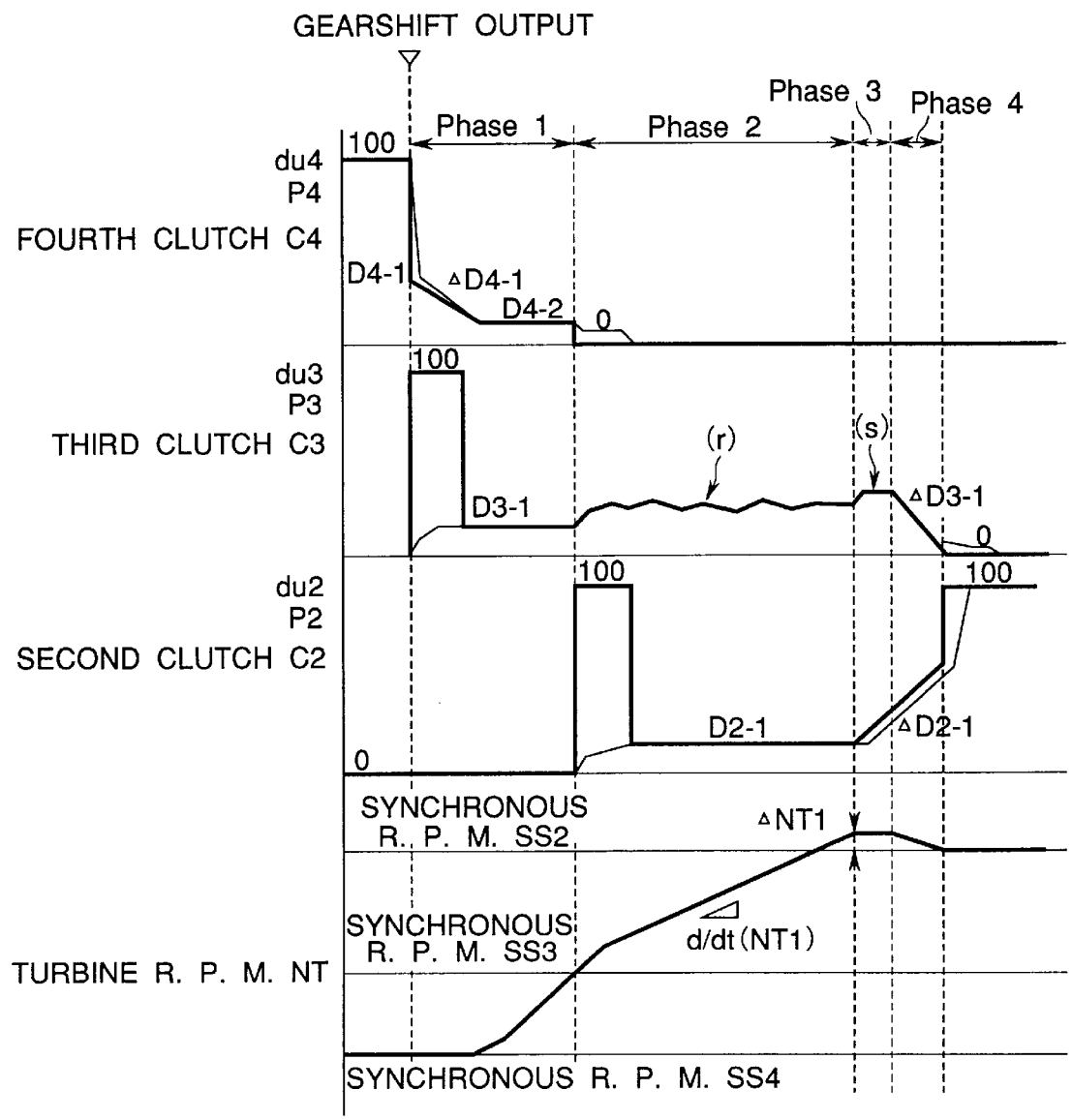
FIG. 8 is a time chart showing the different control characteristics of an automatic transmission for a motor vehicle to which the present invention is applied.

A time chart in FIG. 8 illustrates an example in such a case. The feedback controls are performed at parts (r) and (s) indicated in the figure.

Figure 9:
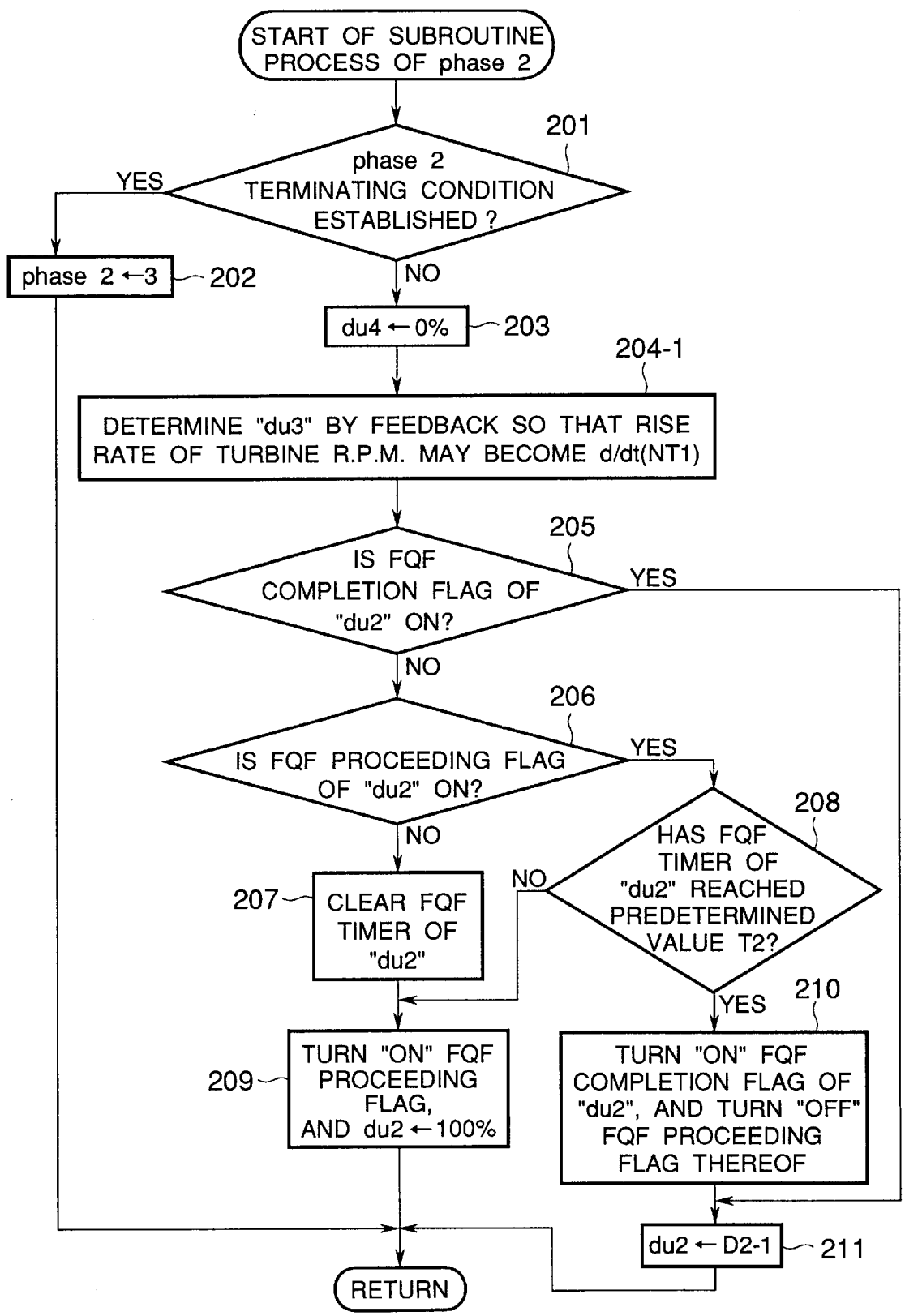
FIG. 9 is a flow chart of the subroutine of phase 2 which is included in a control flow for attaining the characteristics depicted in FIG. 8.
Figure 10:
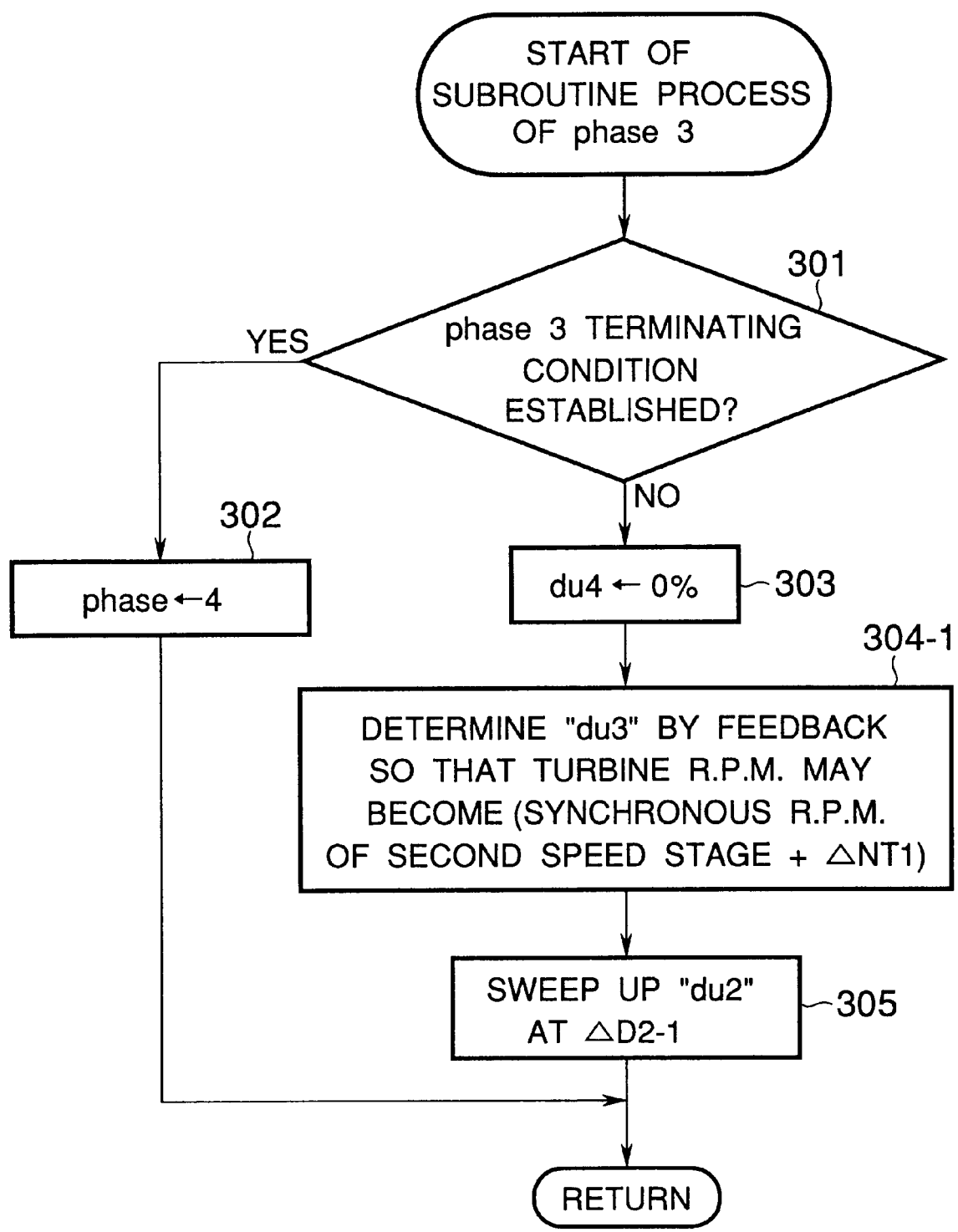
FIG. 10 is a flow chart of the subroutine of phase 3 which is included in a control flow for attaining the characteristics depicted in FIG. 8.

FIG. 9 is a flow chart showing a modified embodiment for the phase 2, while FIG. 10 is a flow chart showing a modified embodiment for the phase 3.

In the flow chart of the modified embodiment shown in FIG. 9, the step 204 explained before is replaced with a step 204-1, at which the duty ratio du3 of the third speed stage is determined by feedback so that the rise rate of the turbine r.p.m. NT may become the value d/dt(NT1).

Likewise, in the flow chart of the modified embodiment shown in FIG. 10, the step 304 explained before is replaced with a step 304-1, at which the duty ratio du3 of the third speed stage is determined by feedback so that the turbine r.p.m. NT may become the value, the synchronous r.p.m. SS2 of the second speed stage+Δ NT1.

In this manner, the duty ratio du3 of the third-speed-stage clutch C3 is determined by the feedback, whereby expected control characteristics can be ensured even in the presence of the secular changes and individual differences (manufactural discrepancies) of components which constitute the clutches.

Especially, in the case where the feedback control is performed at the part (r) by the step 204-1, the turbine r.p.m. NT can be smoothly raised (at the desired rate) irrespective of the manufactural discrepanies.

Besides, in the case where the feedback control is performed at the part (s) by the step 304-1, an action to be explained below is attained. When the second-speed-stage clutch C2 has come to have the torque capacity, the turbine r.p.m. NT are pulled down to the synchronous r.p.m. SS2 of the second speed stage. However, the third-speed-stage clutch C3 is to be controlled so that the turbine r.p.m. NT is kept at the level which is the predetermined value Δ NT1 higher than the synchronous r.p.m. SS2 of the second speed stage. As a result, the third-speed-stage clutch C3 inevitably acts to progress toward its release side by the feedback control, whereby the third-speed-stage clutch C3 and the second-speed-stage clutch C2 can be changed-over very smoothly.

As described above, according to the present invention, a skip downshift from a higher speed stage to a lower speed stage is executed while utilizing a clutch-to-clutch operation for an intermediate-stage clutch, so that the input r.p.m. of a transmission can be smoothly varied. Accordingly, almost the same effect as in the case of executing one stage gearshift by a clutch-to-clutch control is brought forth, a shortened gearshifting time period as well as a smooth torque variation are realized, and a gearshift shock can be alleviated. Besides, in case of subjecting the hydraulic pressure of the intermediate-stage clutch to a feedback control, expected characteristics can be ensured even in the presence of the secular changes and individual differences of constituent components, and especially, the changeover between the intermediate-stage clutch and a lower-speed-stage clutch can be done favorably.

What is claimed is:

1. A gearshift control apparatus for an automatic transmission wherein a skip downshift from a higher speed stage to a lower speed stage in a power-ON state is executed via a stage intermediate between the higher and lower speed stages, and wherein each of a gearshift from the higher speed stage to the intermediate stage, a gearshift from the intermediate stage to the lower speed stage, and a gearshift from the higher speed stage to the lower speed stage is done through a clutch to-clutch operation based on releasing and engaging a plurality of clutches, comprising:

first detection means for detecting a judgement that the power ON skip downshift from said higher speed stage to said lower speed stage is to be executed;

first control means for operating after the detection by said first detection means to lower a hydraulic pressure of the higher speed-stage clutch and thereby to raise input speed of said transmission;

second detection means for detecting a fact that the input speed of said transmission have reached synchronous speed of said intermediate stage owing to the operation of said first control means;

second control means for operating after the detection by said second detection means to raise and adjust a hydraulic pressure of the intermediate-stage clutch so that a rise rate of said input speed of said transmission may become a specific value;

third detection means for detecting a fact that said input speed of said transmission have exceeded synchronous speed of said lower speed stage owing to the operation of said second control means;

third control means for operating after the detection by said third detection means to adjust the hydraulic pressure of said intermediate-stage clutch so that said input speed of said transmission may keep specific speed higher than the synchronous speed of said lower speed stage, and simultaneously to gradually raise a hydraulic pressure of the lower-speed-stage clutch; and fourth control means for gradually lowering said hydraulic pressure of said intermediate-stage clutch after lapse of a predetermined time period since start of the operation of said third control means.

2. A gearshift control apparatus for an automatic transmission as defined in claim 1, wherein the adjustment of said hydraulic pressure of said intermediate-stage clutch by at least either of said second control means and said third control means is made by a feedback control.

* * * * *

UNITED STATES PATENT AND TRADEMARK OFFICE
CERTIFICATE OF CORRECTION

PATENT NO. : 5,961,421

DATED : October 5, 1999

INVENTOR(S): Kazumi HOSHIYA et al.

It is certified that an error appears in the above-identified patent and that said Letters Patent is hereby corrected as shown below:

On the title page, item [54], and at the top of Column 1, the title should be:

--[54] GEARSHIFT CONTROL APPARATUS FOR AUTOMATIC TRANSMISSION--

Signed and Sealed this

First Day of May, 2001

Attest:

NICHOLAS P. GODICI

Attesting Officer  Acting Director of the United States Patent and Trademark Office